(12) United States Patent
Sun et al.

(10) Patent No.: US 8,675,472 B2
(45) Date of Patent: Mar. 18, 2014

(54) METHOD AND APPARATUS FOR NETWORK MANAGEMENT SYSTEM

(75) Inventors: Wei-Ping Stephen Sun, San Jose, CA (US); Bernard Roycroft James, Mountain View, CA (US); Eric Fronberg, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1893 days.

(21) Appl. No.: 11/367,154

(22) Filed: Mar. 3, 2006

(65) Prior Publication Data

US 2006/0161674 A1 Jul. 20, 2006

Related U.S. Application Data

(62) Division of application No. 09/500,391, filed on Feb. 8, 2000, now Pat. No. 7,031,263.

(51) Int. Cl.
*H04J 1/16* (2006.01)
*H04L 12/26* (2006.01)

(52) U.S. Cl.
USPC .......................................... 370/216; 370/252

(58) Field of Classification Search
None
See application file for complete search history.

(56) References Cited

U.S. PATENT DOCUMENTS

| | | | |
|---|---|---|---|
| 5,349,643 A | 9/1994 | Cox et al. | |
| 5,715,394 A | 2/1998 | Jabs | 395/200.11 |
| 5,764,756 A | 6/1998 | Onweller | 379/242 |
| 5,802,047 A | 9/1998 | Kinoshita | 370/359 |
| 5,812,529 A | 9/1998 | Czarnik et al. | 370/245 |
| 5,872,968 A * | 2/1999 | Knox et al. | 709/222 |
| 5,878,228 A * | 3/1999 | Miller et al. | 709/235 |
| 5,909,430 A * | 6/1999 | Reaves | 370/254 |
| 5,968,116 A | 10/1999 | Day, II et al. | 709/202 |
| 5,974,547 A * | 10/1999 | Klimenko | 709/220 |
| 5,978,911 A * | 11/1999 | Knox et al. | 717/176 |
| 6,055,632 A * | 4/2000 | Deegan et al. | 709/221 |
| 6,119,160 A | 9/2000 | Zhang et al. | 709/224 |
| 6,167,567 A * | 12/2000 | Chiles et al. | 717/173 |
| 6,170,008 B1 | 1/2001 | Bahlmann et al. | |
| 6,185,623 B1 | 2/2001 | Bailey et al. | |
| 6,205,476 B1 | 3/2001 | Hayes, Jr. | |
| 6,230,319 B1 * | 5/2001 | Britt et al. | 717/173 |

(Continued)

OTHER PUBLICATIONS

K.R. Sollins, "The TFTP Protocol (Revision 2)," Jun. 1981, IETF RFC 783, pp. 1-17.

*Primary Examiner* — Steven H Nguyen
(74) *Attorney, Agent, or Firm* — Patent Capital Group

(57) ABSTRACT

A network management system has a bus and a system controller connected to the bus. The bus has a plurality of fixed ports, where each of the ports is capable of connecting a router card to the system controller. A method of sending a file from the system controller to a router card includes receiving a request packet from the router card where the request packet includes a file type and the port address, identifying the file from the file type and the port address, and sending the file to the router card. The system controller has a memory storing the location of files associated with each of the port addresses, a request receiver for receiving a request for a file of a file type from a router card, an identifier for identifying a file, and a sender for sending the identified file to the router card. The router card has a memory for storing an operating system image and a configuration, and a request sender for sending a request for an operating system image and a configuration to the system controller upon power-up of the router card.

19 Claims, 5 Drawing Sheets

(56) References Cited

U.S. PATENT DOCUMENTS

| | | | |
|---|---|---|---|
| 6,256,673 B1 * | 7/2001 | Gayman | 709/232 |
| 6,463,530 B1 | 10/2002 | Sposato | |
| 6,563,821 B1 | 5/2003 | Hong et al. | |
| 6,643,506 B1 * | 11/2003 | Criss et al. | 455/418 |
| 6,772,204 B1 * | 8/2004 | Hansen | 709/220 |
| 7,031,263 B1 * | 4/2006 | Sun et al. | 370/252 |
| 7,089,300 B1 * | 8/2006 | Birse et al. | 709/222 |
| 2003/0200273 A1 | 10/2003 | Khanna et al. | |

* cited by examiner

METHOD AND APPARATUS FOR NETWORK MANAGEMENT SYSTEM

STATEMENT OF RELATED APPLICATION(S)

The present application is a divisional of co-pending U.S. patent application Ser. No. 09/500,391, filed Feb. 8, 2000, issued as U.S. Pat. No. 7,031,263 on Apr. 18, 2006, in the name of inventors Wei-Ping Sun, Beau James, and Eric Fronberg, all commonly owned herewith.

TECHNICAL FIELD

The present invention relates to network management. More particularly, the present invention relates to a method and apparatus for providing a single point of control in a network management system.

BACKGROUND

Network management systems are used to provide accessibility and security for local area networks (LANs). Such systems may include several components in a chassis or other configuration. The major components of a network management system include system controllers and router cards, which are connected within the system by a bus. The router cards perform routing operations, including network security. System controllers coordinate the activities of the components of the system and provide a point of control for the system manager.

Ideally, a network management system should operate with a minimum of downtime and should be flexible enough to allow a system manager to modify the system while it is operating. Therefore, network management systems typically have redundant components which are capable of being replaced while the system is operating. Redundant components may include system controllers and router cards.

Adding or replacing router cards in a system requires a method of providing suitable configurations and operating systems to a new router card so that the card can operate effectively in the system. Similarly, if a router card fails and a backup router card must be pressed into service to replace the failed card, the backup card must be provided with a suitable configuration and operating system. Currently, such provision of configurations and operating systems is often performed by the system manager. Further, the manager may have to individually program each new router card if a single point of control is not available.

It is desirable that a network management system have a single point of control. With a single point of control, centralized in a system controller, a system manager can avoid having to program all system components separately. Further, it is desirable the single point of control provide the necessary files to the router cards automatically, without need for intervention by the system manager.

BRIEF DESCRIPTION

A network management system has a bus and a system controller connected to the bus. The bus has a plurality of fixed ports, where each of the ports is capable of connecting a router card to the system controller. A method of sending a file from the system controller to a router card includes receiving a request packet from the router card where the request packet includes a file type and the port address, identifying the file from the file type and the port address, and sending the file to the router card. The system controller has a memory storing the location of files associated with each of the port addresses, a request receiver for receiving a request for a file of a file type from a router card, an identifier for identifying a file, and a sender for sending the identified file to the router card. The router card has a memory for storing an operating system image and a configuration, and a request sender for sending a request for an operating system image and a configuration to the system controller upon power-up of the router card.

DETAILED DESCRIPTION

Those of ordinary skill in the art will realize that the following description of the present invention is illustrative only and not in any way limiting. Other embodiments of the invention will readily suggest themselves to such skilled persons having the benefit of this disclosure.

Figure 1:
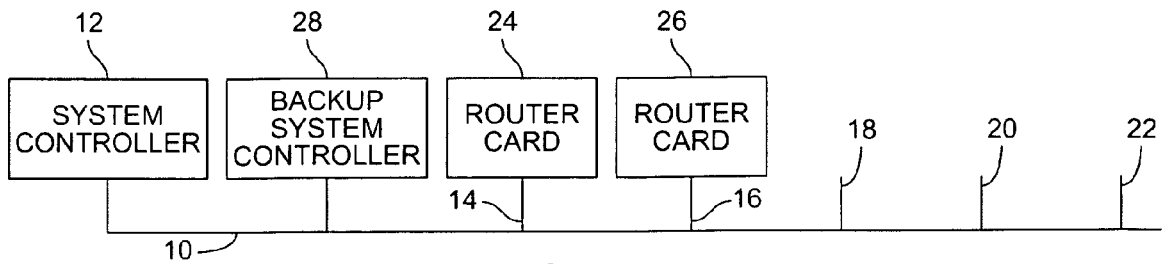
FIG. 1 is a block diagram showing the functional components of the system in accordance with a specific embodiment of the present invention.

The invention comprises a network management system and its associated components and methods. FIG. 1 is a block diagram showing the functional components of the system in accordance with an embodiment of the present invention. The system includes a bus (10) and a system controller (12) connected to the bus. The bus has a plurality of fixed ports (14, 16, 18, 20, 22) capable of connecting a router card to the system controller via the bus. Two router cards (24, 26) are shown connected to the bus (10) at ports 14 and 16. The system may also include a backup system controller (28) connected to the bus, as well as other components connected to the bus. The system may be organized in a chassis to facilitate changing of components. When the system is organized in a chassis, the bus may be incorporated into the back plane of the chassis.

Figure 2:
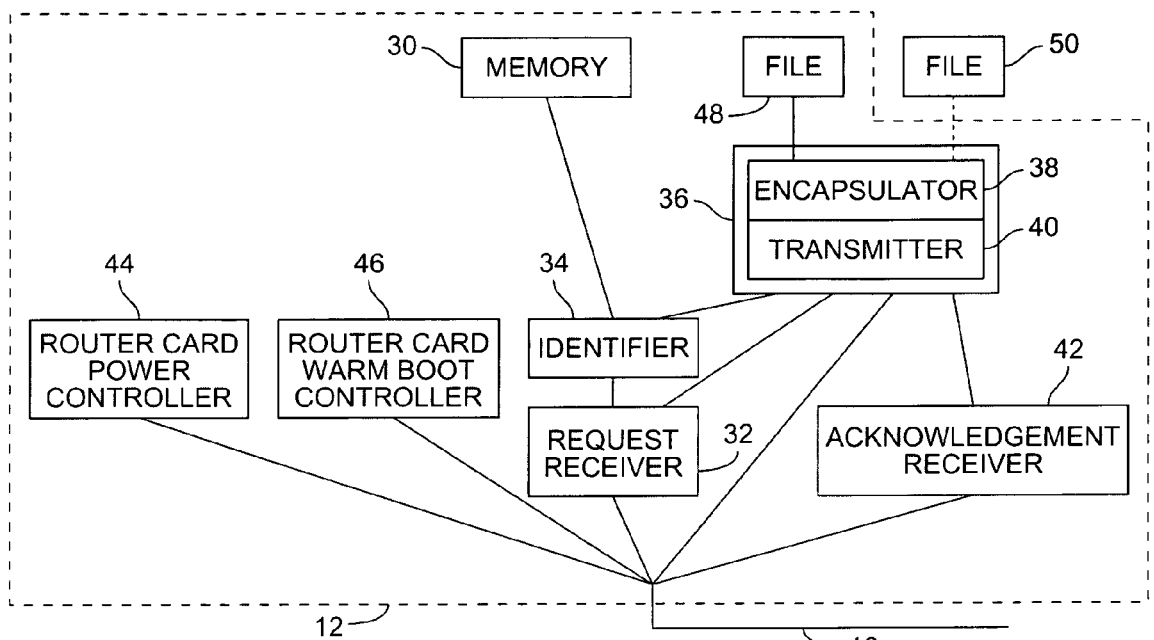
FIG. 2 is a block diagram showing the functional components of a system controller in accordance with a specific embodiment of the present invention.

The system includes a system controller having memory and processing capabilities. FIG. 2 is a block diagram showing the functional components of a system controller in accordance with an embodiment of the present invention. The system controller (12) is connected to the system bus (10). The system controller (12) has a memory (30) storing the location of files associated with each of the port addresses on the bus (10). The files associated with the ports are of types including configuration files and operating system files. The system controller includes a request receiver (32) for receiving a request for a file of a file type from a router card connected to the system controller at one of the ports. An identifier (34) communicates with the request receiver (32). The identifier (34) uses information in the memory (30), as well as information included in the request, to identify a file. A sender (36) sends the identified file to the router card which made the request.

In the system controller (12), the sender (36) includes an encapsulator (38) which encapsulates the file into a series of data packets. The sender (36) also includes a transmitter (40) for transmitting the data packets one at a time. An acknowledgment receiver (42) receives acknowledgments from the router card for individual data packets and causes the transmitter (40) to re-transmit a data packet if a proper acknowledgment for the data packet is not received. The acknowledgment receiver (42) causes the transmitter (40) to transmit the next data packet if a proper acknowledgment for a data packet is received.

The system controller (12) also includes a router card power controller (44) for instructing the router card to power down and then power up. A router card warm boot controller (46) is capable of instructing the router card to perform a warm boot. The system controller (12) may be designed so that either the router card power controller (44) or the router card warm boot controller (46) operates upon detecting the failure of another router card connected to the bus.

The system controller (12) may include memory for storing the requested files (48), or the files may be located at a remote file server (50). As described below, the request received by the request receiver (32) consists essentially of a system frame header, a request code, and a file type.

Figure 3:
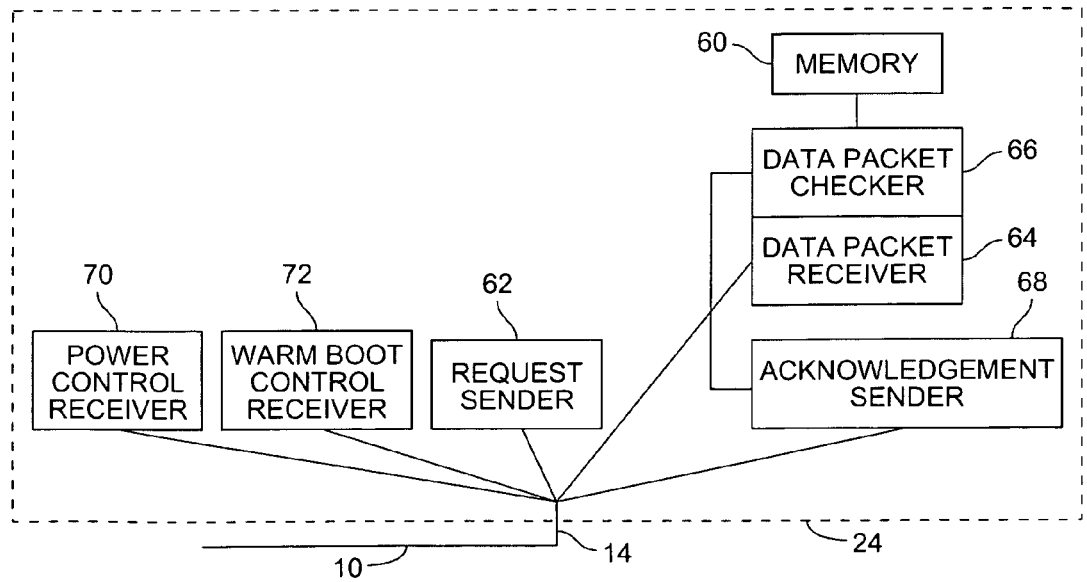
FIG. 3 is a block diagram showing the functional components of a router card in accordance with a specific embodiment of the present invention.

One or more router cards are connected to the bus in the system. Each router card has memory and processing capabilities. FIG. 3 is a block diagram showing the functional components of a router card in accordance with an embodiment of the present invention. The router card (24) is removably connected to the bus (10) at a port (14). The router card (24) includes a memory (60) for storing files, including an operating system image and a configuration. The memory (60) is essentially empty upon power-up of the router card.

A request sender (62) sends requests for files including an operating system image and a configuration to the system controller upon power-up or warm booting of the router card (24). When using the protocol described below, each request packet consists essentially of a system frame header, a request code, and a file type. A single request packet may be used for each file, or a single request packet may be used to request multiple files.

A data packet receiver (64) receives data packets comprising the requested files from the system controller, and a data packet checker (66) checks whether each data packet is received in good order. An acknowledgment sender (68) sends an acknowledgment for a data packet to the system controller if the data packet received is in good order. The acknowledgement sender (68) re-sends a duplicate acknowledgment for the previous data packet to the system controller if a data package is not received. When using the protocol described below, such acknowledgments consist essentially of a system frame header, an acknowledgment code, and a block number.

The router card (24) may have a power control receiver (70) for receiving an instruction from the system controller to first power down and then power up. Alternatively, the router card (24) may have a warm boot control receiver (72) for receiving an instruction from the system controller to perform a warm boot.

Figure 4:
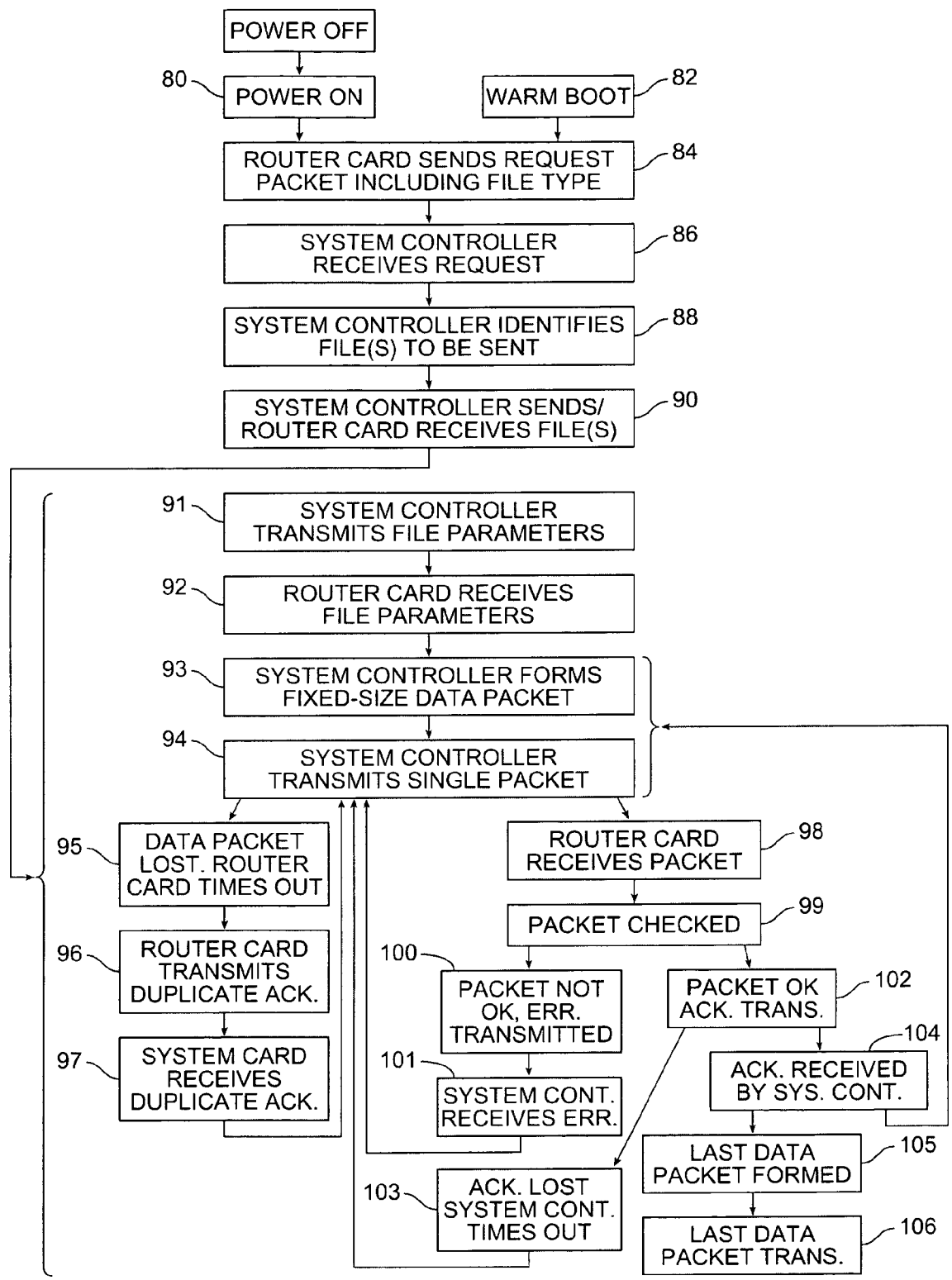
FIG. 4 is a process flow diagram showing the steps in a method of sending a file from the system controller to a router card in accordance with a specific embodiment of the present invention.

The invention includes a method of transferring files from the system controller to a router card. FIG. 4 is a process flow diagram showing the steps in a method of sending a file from the system controller to a router card in accordance with a specific embodiment of the present invention. The process may be triggered by powering a router card on (80) or warm booting the router card (82). Both of these events are significant in that the router card begins the process in a state where its memory for storing a configuration file and operating system are essentially empty. Typically, this situation arises when a new router card is installed in the system or when a router card is pressed into service for another router card which has gone out of service. When a new router card is installed, it may be powered on manually. When a router card is pressed into service as a backup, the system controller may direct it to power off and on or to perform a warm boot.

The file transfer process begins when a router sends a request to the system controller (84). The request is in the form of a request packet, as described below, and includes a file type. The request includes a system frame header and a request code, where the system frame header include the address of the system controller and the port address of the router card and is less than or equal to 12 bytes in size.

The system controller receives the request packet from the router card (86). The system controller identifies the file or files (88) from the file type and the port address. Once identified, the file is sent from the system controller to the router card (90).

When using the protocol described below, the process of sending the file includes several discrete steps. First, file parameters may be sent by the system controller (91) and received by the router card (92) after the file is identified. These parameters indicate the file size and filename of the file to be transferred. Then, the system controller forms a data packet from the file (93), where the data packet is of a fixed size and includes a system frame header and a data packet protocol header. The data packet protocol header consists essentially of an operation code, a block number, a file type and a checksum. The system frame header specifies the addresses of the router card and the system controller and is less than or equal to 12 bytes in size. The data packet is transmitted by the system controller (94) to the router card.

If the data packet is lost, the router card will time out (95). The router card then sends a duplicate acknowledgement for the previous data packet (96) which is received by the system controller (97). This signals the system controller to transmit the data packet again (94). The time out occurs because the router does not receive a new data packet within a certain time after the router card transmitted its last acknowledgement.

The router card receives the data packet (98). Then, the router card checks the content of the data packet (99). If there is an error in the content of the packet, the router card sends an error message (100) which is received by the system controller (101), thereby causing the data packet to be transmitted again (94). If the router card determines that the data packet is in good order, the router card sends an acknowledgement for that packet (102). If the acknowledgement is lost, the system controller times out (103) because the system controller does not receive a new acknowledgement within a certain time after the system controller transmitted its last data packet. The time out causes the system controller to re-transmit the data packet (94). When the acknowledgement is received by the system controller (104), the system controller sends the next data packet from the file, using the steps 93-104.

The last data packet in the file is formed having a size less than the fixed size of the other data packets (105), signaling the router card that the file transfer is complete. The final packet is transmitted to the router card (106) using the same control mechanisms as for the other data packets, except as described below.

The Protocol

The protocol is used to transfer files between the system controller and the router card via the system interface. The interface is designed to allow communication between system components, including the file transfer operations described herein. The system interface transmits packets of fixed length between system components, and system components using the interface have system buffers of a size equal to the fixed length.

The protocol is designed to be small and easy to implement. Therefore, it lacks some of the features of a regular file transfer protocol. For example, it has no provisions for user authentication. The only thing it can do is to mail the packet to and from between the system controller and the router card.
Overview of the Protocol The device that begins with a request is the router card, or client, and the device that grants the request is the system controller, or server. If the server grants the request from the client, the connection is opened and the file is sent in fixed length blocks of the length of the system buffer size. Each data packet contains one block of data, and must be acknowledged by a proper acknowledgment packet before the next packet can be sent. To be proper, an acknowledgement packet must be received by the system controller and include the proper block number, source, and destination as described below. A data packet of less than the length of the system buffer size signals termination of a transfer. If a packet gets lost in the network, the intended recipient will timeout and may retransmit his last packet (which may be data or an acknowledgment), thus causing the sender of the lost packet to retransmit that lost packet. The sender has to keep just one packet on hand for retransmission, since the lock step acknowledgment guarantees that all older packets have been received. Notice that both nodes involved in a transfer are considered senders and receivers. One sends data and receives acknowledgments, the other sends acknowledgments and receives data.

Most errors cause termination of the connection. An error is signaled by sending an error packet. This packet is not acknowledged, and not retransmitted, so the other end of the connection may not get it. Therefore timeouts are used to detect such a termination when the error packet has been lost. Errors are caused by three types of events: not being able to satisfy the request (e.g., file not found, access violation), receiving a packet which cannot be explained by a delay or duplication in the network (e.g., an incorrectly formed packet), and losing access to a necessary resource (e.g., memory full or access denied during a transfer).

The protocol is very restrictive, in order to simplify implementation. For example, the fixed length blocks make allocation straightforward, and the lock step acknowledgement provides flow control and eliminates the need to reorder incoming data packets.

Figure 5A:
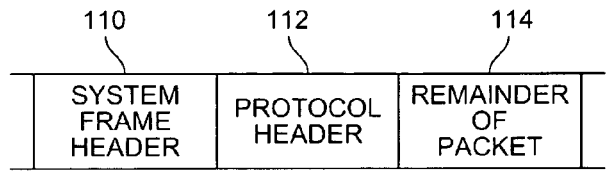
FIG. 5A is diagram of a system packet according to a specific embodiment of the present invention.
Figure 5B:
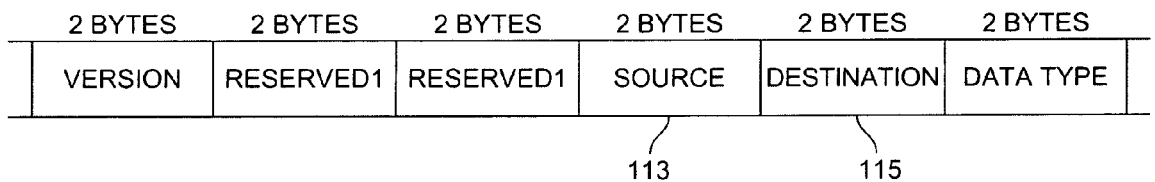
FIG. 5B is diagram of a system frame header according to a specific embodiment of the present invention.

The protocol is designed to be implemented on top of the system interface. The data packets will have a system frame header and a protocol header. FIG. 5A is a diagram of a system packet according to a specific embodiment of the present invention. As shown in FIG. 5A, the order of the contents of a packet will be: system frame header (110), protocol header (112), followed by the remainder of the packet (114). FIG. 5B is a diagram of a system frame header according to a specific embodiment of the present invention. The source (113) and destination (115) port numbers are specified in the system frame header.

Figure 6:
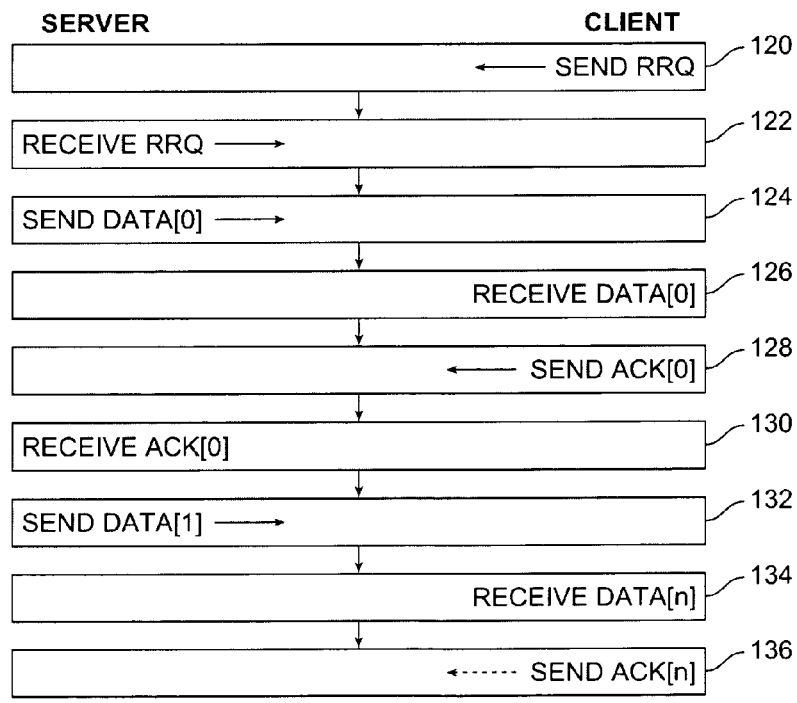
FIG. 6 is a process flow diagram showing the steps of establishing and continuing a connection between client and server in accordance with a specific embodiment of the present invention.

The protocol header consists of a 2 byte opcode field which indicates the packet's type (e.g., DATA, ERROR, etc.) These opcodes and the formats of the various types of packets are discussed further in the section on protocol packets.
Initial Connection FIG. 6 is a process flow diagram showing the steps of establishing and continuing a connection between client and server in accordance with an embodiment of the present invention. Note that RRQ, ACK, and DATA are the names of the read request, acknowledgment, and data types of packets respectively.

A transfer is established by sending a request from the client to the server (120). The request is received by the server (122). A positive response from the server is a special data packet called DATA[0] (124). By way of background, each data packet has associated with it a block number. Block numbers are consecutive and begin with one. In the special data packet the block number is zero. The special data packet contains file parameters, namely, the filename and file size as well as a checksum.

The client responds to data packets with acknowledgments. An acknowledgment packet will contain the block number of the data packet being acknowledged. After receiving the special data packet (126), the client responds to the special data packet with an acknowledgement packet indicating block number zero (128). The server receives this acknowledgement (130). Subsequently, the server sends data packets beginning with block one (132) and, if all goes well, the data packets are received by the client (134) and acknowledgements are sent by the client (136).

During the file transfer process, system port addresses are agreed upon as follows. The router card sends a "RRQ" to the system controller with destination in the system frame header equal to the system controller port number. The source in the system frame header will identify the port address of the router card. The system controller then sends a "DATA" (with block number=0) to the router card with source in the system frame header equal to the router card port number. The router card sends a "ACK" (with block number=0) to the system controller.

After the connection has been established, the first data packet can be sent by the system controller with a block number of 1. In the next step, and in all succeeding steps, the system controller should make sure that the source port number matches the value that was agreed on. If the source port number does not match, the packet should be discarded as erroneously sent from somewhere else. An error packet should be sent to the source of the incorrect packet, while not disturbing the transfer.

Figure 7:
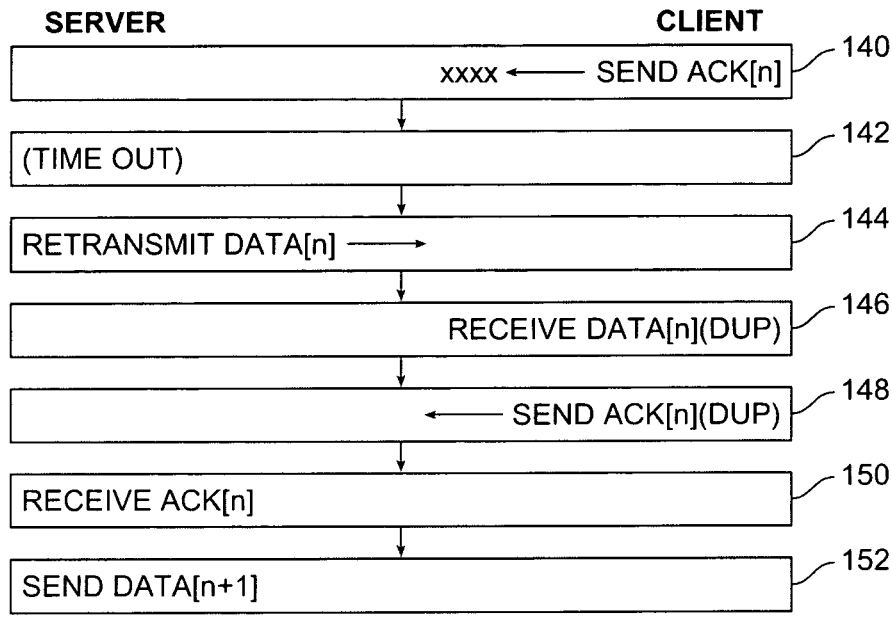
FIG. 7 is a process flow diagram showing the steps in the protocol in the event of a lost acknowledgement packet in accordance with a specific embodiment of the present invention.

FIG. 7 is a process flow diagram showing the steps in the protocol in the event of a lost acknowledgement packet in accordance with a specific embodiment of the present invention. If an acknowledgement packet is lost (140), the server will time out (142) and retransmit the last data packet it sent (144). The client receives the duplicate data packet (146), and sends a duplicate of the lost acknowledgement (148). Upon receiving the proper acknowledgement (150), the server transmits the next data packet (152).

Figure 8:
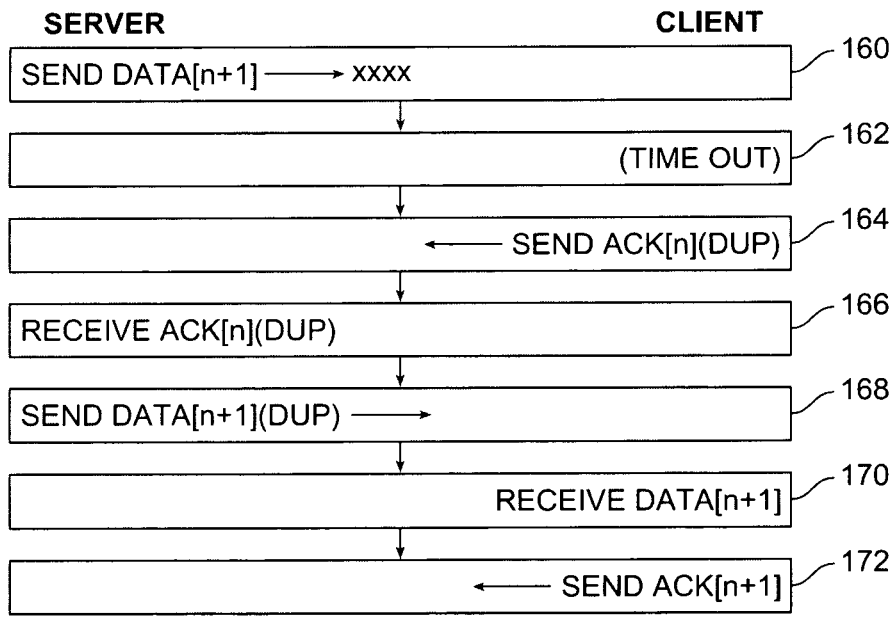
FIG. 8 is a process flow diagram showing the steps in the protocol in the event of a lost data packet in accordance with a specific embodiment of the present invention.

FIG. 8 is a process flow diagram showing the steps in the protocol in the event of a lost data packet in accordance with a specific embodiment of the present invention. If a data packet is lost (160), the client will time out (162) and retransmit the last acknowledgement packet it sent (164). The server receives the duplicate acknowledgement packet (166), and sends a duplicate of the lost data packet (168). The duplicate data packet is received by the client (170) and an acknowledgement is sent (172).

The Protocol Packets

The protocol supports four types of packets, all of which have been mentioned above. The protocol header of a packet contains the opcode associated with that packet, as shown in Table 1.

TABLE 1

| opcode | operation |
| --- | --- |
| 1 | Read request (RRQ) |
| 2 | Data (DATA) |
| 3 | Acknowledgment (ACK) |
| 4 | Error (ERROR) |

Figure 9:
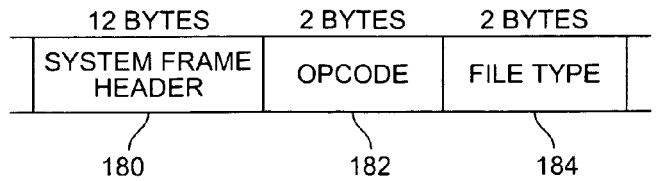
FIG. 9 is a diagram showing the format of a request packet in accordance with a specific embodiment of the present invention.

FIG. 9 is a diagram showing the format of a request packet in accordance with a specific embodiment of the present invention. The request packet includes a system frame header (180), the RRQ opcode (182), and a file type (184). The type is the requesting file type, for example TYPE_IMAGE for operating system image file or TYPE_CONFIG for configuration file. The type is user defined and is recognized by both client and server. If the type is not recognized or is not allowed by the receiver then the packet should be discarded and an error packet should be sent to the source of the incorrect packet. The protocol allows only one connection between client and server at any one time. The second connection request should be rejected if the first connection is still alive. The first connection will be maintained while the second is rejected by returning an error packet.

Figure 10:
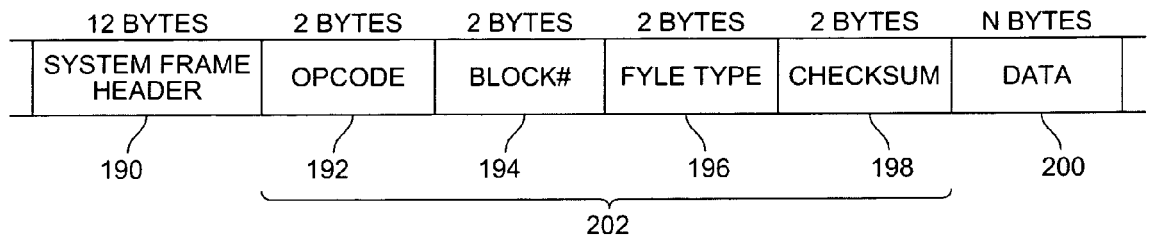
FIG. 10 is a diagram showing the format of a data packet in accordance with a specific embodiment of the present invention.

Data is transferred in DATA packets. FIG. 10 is a diagram showing the format of a data packet in accordance with a specific embodiment of the present invention. The data packet includes a system frame header (190), the DATA opcode (192), the data block number (194), the file type (196), a checksum (198), and data (200). The opcode, block number, type, and checksum may collectively be referred to a data packet protocol header (202). The block numbers on data packets begin with one and increase by one for each new block of data. The block number on data packet with zero is a special packet response to the RRQ. The data packet with block number zero contains parameters for the client to initialize itself properly. The parameters are defined for different types and need to be recognized by both client and server. For example, the parameters for TYPE_IMAGE can be filename, file size and file checksum. The checksum is the checksum number of each data packet. The receiver generates a checksum on the data packet after receiving the packet and compares it to the checksum number in the checksum field. If the number is different then the packet is dropped and error packet is sent to server to request retransmission. The data field is from zero byte to system buffer size headers (system header+data packet protocol header) size long. If it is equal to system buffer size−header size bytes, the block is not the last block of data if it is from zero bytes to data field size−1 long, it signals the end of the transfer.

Figure 11:
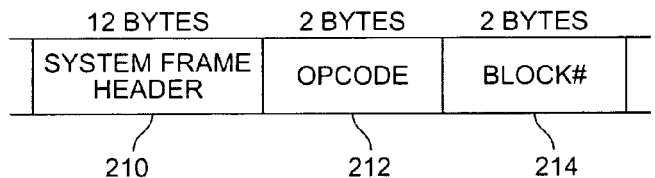
FIG. 11 is a diagram showing the format of a acknowledgement packet in accordance with a specific embodiment of the present invention.

All DATA packets are acknowledged by ACK or ERROR packets unless a timeout occurs. The RRQ and ACK packets are acknowledged by DATA or ERROR packets. FIG. 11 is a diagram showing the format of an acknowledgement packet in accordance with a specific embodiment of the present invention. The acknowledgement packet includes a system frame header (210), the acknowledgement packet opcode (212), and the data block number (214). The block number in an ACK echoes the block number of the DATA packet being acknowledged.

Figure 12:
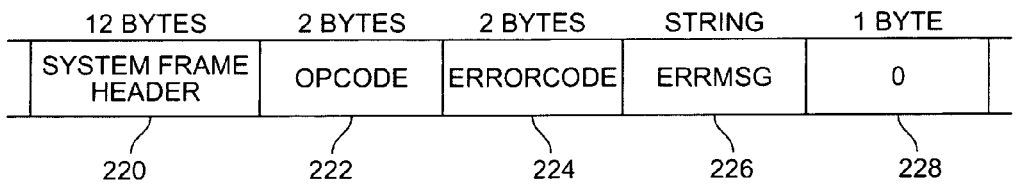
FIG. 12 is a diagram showing the format of an error packet in accordance with a specific embodiment of the present invention.

FIG. 12 is a diagram showing the format of an error packet in accordance with a specific embodiment of the present invention. The error packet includes a system frame header (220), the error opcode (222), a code describing the specific type of error (224), an error message (226), and a zero byte (228). An ERROR packet can be the acknowledgment of any other type of packet. The error code is an integer indicating the nature of the error. The error message is intended for human consumption, and should be in netascii. It is terminated with a zero byte. Both the system controller and the router card have error message senders and error message receivers to implement the sending and receiving of error messages.

Normal Termination

The end of a transfer is marked by a DATA packet that contains between 0 and data field size minus one of data. This packet is acknowledged by an ACK packet like all other DATA packets. The server acknowledging the final DATA packet may terminate its side of the connection on sending the final ACK. On the other hand, delaying is encouraged. This means that the server sending the final ACK will wait for a while before terminating in order to retransmit the final ACK if it has been lost. The acknowledger will know that the ACK has been lost if it receives the final DATA packet again. The server sending the last DATA must retransmit it until the packet is acknowledged or the sending server times out. If the response is an ACK, the transmission was completed successfully. If the sender of the data times out and is not prepared to retransmit any more, the transfer may still have been completed successfully, after which the acknowledger or network may have experienced a problem. It is also possible in this case that the transfer was unsuccessful. In any case, the connection has been closed.

Premature Termination

If a request can not be granted, or some error occurs during the transfer, then an ERROR packet (opcode 4) is sent. This is only a courtesy since it will not be retransmitted or acknowledged, so it may never be received. Timeouts must also be used to detect errors.

System Design

The system controller is designed to simultaneously handle multiple image downlaod requests from router cards. The image download request will initialize a system controller image download process to handle the file transfer. It is a point to point connection and only one connection is allowed at any one time for each port address. The process will be terminated once the image download process completed. Multiple image download processes may be launched to handle multiple router card image requests.

System Flow

The following summarizes the steps of image download.

(a) The router card initiates the image download request to the system controller.

(b) The system controller verifies the request and checks its memory for router card port number, image filename and router card root path. If the image can not be found or opened then the system controller responds with an error packet. Otherwise, the system controller responds with the image file size and name.

(c) The router card allocates buffer to store the image and acknowledges with "ready to receive" message (ACK[0]).

(d) The system controller opens the image file, copies the first block (block size=system buffer size−header size) and sends to the router card.

(e) The router card copies the data block to DRAM and acknowledges with data block number and checksum.

(f) The system controller verifies the checksum number and retransmits the message if there is a checksum error, otherwise copies the next block and sends to the router card.

(g) Steps (e) and (f) are repeated until all messages are received by the router card.

(h) The system controller sends an end-of-file message with image checksum number to the router card for connection termination.

(i) The router card verifies the total bytes received and system image checksum number. If it doesn't match then the router card re-requests an image.

(j) The router card launches the operating system image.

A timer will be associated with each message for error (timeout) correction.

If a non-active router card (router card two) is designated as a backup to an active router card (router card one), the non-active router will run the same image of the active router when it becomes active. The active and non-active router cards may run different images initially. However, after failure of the router card one, router card two will be reloaded and request its image from the system controller. The system controller image download process will verify the redundancy information first when receiving the request, and find the router card one image and configuration and sends the files to router card two. For example, (a) Router card one at port 1 and router card two and port 2 run different images initially.

(b) The router cards are configured as a redundant pair with router card one as the active router card.

(c) Router card one crashes. The system controller recognizes the crash and causes router card two to power off and on or to warm boot.

(d) Router card two reloads and requests its image from the system controller.

(e) The system controller image download process verifies that port 1 and port 2 are a redundant pair and loads port 1 image configured in memory. Router card two downloads the port 1 router card image and launches it.

It will be apparent that the functional components of the system controller and the router card may be implemented in a variety of ways. For example, they may be implemented in the form of program storage devices readable by a machine and tangibly embodying a program of instructions executable by the machine to perform the methods described herein. Such implementations may include a variety of operating systems, computing platforms, and/or computer languages. In addition, those of ordinary skill in the art will readily recognize that devices such as hardwired devices, devices relying on FPGA (field programmable gate array) or ASIC (application specific integrated circuit) technology, or the like, may also be used without departing from the scope and spirit of the inventive concepts described herein.

While embodiments and applications of this invention have been shown and described, it would be apparent to those skilled in the art having the benefit of this disclosure that many more modifications than mentioned above are possible without departing from the inventive concepts herein after a review of this disclosure. The invention, therefore, is not to be restricted except in the spirit of the appended claims.

What is claimed is:

1. A network management system having a system controller configured to connect to a bus having a plurality of ports, each of the ports having a port address, the system controller comprising:

a memory configured to store the location of files associated with each of the port addresses, each of the files being of a file type;

a request receiver configured to receive a request for a file of a file type from an active router card connected to the system controller at one of the ports having a port address;

an identifier configured to use the memory, the port address and the request to identify the file, the request not containing a media access control (MAC) address for the active router card and not including information regarding a file name for the file to be retrieved; and a sender configured to send the identified file to the active router card, the system controller being configured to simultaneously handle multiple image download requests, from multiple router cards, using multiple image download processes, wherein a non-active router card, which is designated as a backup to the active router card, runs a same image of the active router card when the non-active router card becomes active such that a failure of the active router card causes a reloading for the non-active router card and a new request for the same image, and wherein the new request causes the system controller to find the same image, along with configuration information, to be sent to the non-active router card.

2. The system of claim 1, wherein the sender further comprises:

an encapsulator configured to encapsulate the file into a series of data packets, the data packets being of a fixed size and including a system header and a data packet protocol header, wherein the data packet protocol header includes an operation code, a block number, a file type, and a checksum; and a transmitter configured to transmit the data packets one at a time.

3. The system of claim 1, wherein the system controller further comprises:

an acknowledgment receiver coupled to the transmitter and configured to receive acknowledgments from the router card for individual data packets, wherein the transmitter is configured to 1.) re-transmit a data packet if a proper acknowledgment for the data packet is not received or 2.) transmit the next data packet if a proper acknowledgment for a data packet is received.

4. The system of claim 1, wherein the system controller further comprises:

a router card power controller configured to instruct the active router card to power down and then power up.

5. The system of claim 1, wherein the system controller further comprises:

a router card warm boot controller configured to instruct the active router card to perform a warm boot.

6. The system of claim 4, wherein the active router card power controller is configured to operate upon detecting the failure of another router card connected to the bus.

7. The system of claim 5, where the active router card warm boot controller is configured to operate upon detecting the failure of another router card connected to the bus.

8. The system of claim 1, wherein the files are located at a remote file server.

9. The system of claim 1, wherein the active router card further comprises:
a memory configured to store an operating system image and a configuration; and
a request sender configured to send a request to the system controller for at least one of an operating system image and a configuration upon power up.

10. The system of claim 9, wherein the active router card further comprises:
a power control receiver configured to receive a power down instruction from the system controller, wherein the active router card powers down and then powers up in response to receiving the power down instruction.

11. The system of claim 9, wherein the active router card further comprises:
a warm boot control receiver configured to receive an instruction from the system controller to perform a warm boot.

12. A network management system comprising:
an active router card configured to send a request for a file of a file type, wherein the request does not contain a media access control (MAC) address for the active router card, the request not including information of a file name of the file requested; and
a system controller connected to the active router card at a port having a port address, the system controller configured to store the location of files associated with the port address in a memory, the system controller configured to access the memory and examine the request to retrieve the file, wherein the request is sent in response to the active router card being powered on such that its memory for storing configuration data and operating system data is substantially empty, wherein the system controller is configured to send the retrieved file to the active router card, the system controller being configured to simultaneously handle multiple image download requests, from multiple router cards, using multiple image download processes, wherein a non-active router card, which is designated as a backup to the active router card, runs a same image of the active router card when the non-active router card becomes active such that a failure of the active router card causes a reloading for the non-active router card and a new request for the same image, and wherein the new request causes the system controller to find the same image, along with configuration information, to be sent to the non-active router card.

13. The system of claim 12, wherein the system controller is configured to encapsulate the file into a series of data packets, the data packets being of a fixed size and including a system header and a data packet protocol header, wherein the data packet protocol header includes an operation code, a block number, a file type, and a checksum.

14. The system of claim 12, wherein the system controller is configured to receive acknowledgments from the active router card for individual data packets, wherein the system controller is configured to either re-transmit a particular data packet if a proper acknowledgment for the particular data packet is not received or transmit the next data packet if a proper acknowledgment for the particular data packet is received.

15. The system of claim 12, wherein the system controller is configured to instruct the active router card to power down and then power up.

16. The system of claim 12, wherein the system controller is configured to instruct the active router card to perform a warm boot.

17. The system of claim 12, wherein the active router card is configured to operate upon detecting the failure of another router card connected to the bus.

18. The system of claim 12, wherein the files are located at a remote file server.

19. A network system having a system controller configured to connect to a bus having a plurality of ports, each of the ports having a port address and being capable of connecting to an active router card, the system controller comprising:
means for receiving a request packet from the active router card, the request packet including a file type and the port address, the request packet not containing a media access control (MAC) address for the active router card and not including information regarding a file name for a file to be retrieved, wherein the request is sent in response to the active router card being powered on such that its memory for storing configuration data and operating system data is substantially empty;
means for retrieving the file;
means for transmitting a size and name of the file to the active router card; and
means for sending one or more data packets comprising the file to the active router card, the system controller being configured to simultaneously handle multiple image download requests, from multiple router cards, using multiple image download processes, wherein a non-active router card, which is designated as a backup to the active router card, runs a same image of the active router card when the non-active router card becomes active such that a failure of the active router card causes a reloading for the non-active router card and a new request for the same image, and wherein the new request causes the system controller to find the same image, along with configuration information, to be sent to the non-active router card.

* * * * *